United States Patent
Rennies et al.

(10) Patent No.: US 11,959,807 B2
(45) Date of Patent: Apr. 16, 2024

(54) THERMAL IMAGING APPARATUS AND METHOD OF THERMAL IMAGING

(71) Applicant: Melexis Technologies NV, Tessenderlo (BE)

(72) Inventors: Jos Rennies, Tessenderlo (BE); Wouter Reusen, Tessenderlo (BE); Luc Buydens, Tessenderlo (BE)

(73) Assignee: Melexis Technologies NV, Tessenderlo (BE)

( * ) Notice: Subject to any disclaimer, the term of this patent is extended or adjusted under 35 U.S.C. 154(b) by 246 days.

(21) Appl. No.: 17/512,776

(22) Filed: Oct. 28, 2021

(65) Prior Publication Data

US 2022/0187135 A1 Jun. 16, 2022

(30) Foreign Application Priority Data

Dec. 16, 2020 (EP) .................................... 20214576

(51) Int. Cl.
*G01J 5/10* (2006.01)
*H04N 5/33* (2023.01)
(Continued)

(52) U.S. Cl.
CPC .................. *G01J 5/10* (2013.01); *H04N 5/33* (2013.01); *H04N 25/46* (2023.01);
(Continued)

(58) Field of Classification Search
CPC .... G06V 30/10; G06V 30/146; G06V 30/148; G06V 10/96; G06V 10/98; G06V 30/224;
(Continued)

(56) References Cited

U.S. PATENT DOCUMENTS

| | | | |
|---|---|---|---|
| 2011/0256631 A1* | 10/2011 | Tomaney | C12Q 1/6874 706/12 |
| 2016/0295208 A1* | 10/2016 | Beall | H04N 23/11 |
| 2018/0082410 A1* | 3/2018 | Schulte | G06F 18/22 |

OTHER PUBLICATIONS

European Search Report for EP Application 20214576 dated Jun. 1, 2021.

(Continued)

*Primary Examiner* — Masum Billah
(74) *Attorney, Agent, or Firm* — Harness, Dickey & Pierce, P.L.C.

(57) ABSTRACT

A thermal imaging apparatus comprising: a thermal detector device (100) comprising an array of thermal sensing pixels (102) and signal processing circuitry (104) coupled to the detector device (100). The circuitry (104) supports a background identifier (110) and a pixel classifier (112), the background identifier (110) comprising a common intensity identifier (114) and an expected background intensity calculator (116). The background identifier (110) receives pixel measurement data captured by the detector device (100) in respect of pixels of the array (102) and the common intensity identifier (114) identifies a largest number of substantially the same pixel intensity values from the pixel measurement data. The expected background intensity calculator (116) uses the largest number of substantially the same pixel intensity values to generate a model of expected background intensity levels. The pixel classifier (112) uses the model to determine whether an intensity measurement by a pixel (118) of the array (102) corresponds to a background or an object in an image.

21 Claims, 5 Drawing Sheets

(51) Int. Cl.
  *H04N 25/46*    (2023.01)
  *H04N 25/702*   (2023.01)
  *G01J 5/00*     (2022.01)

(52) U.S. Cl.
  CPC .... *H04N 25/702* (2023.01); *G01J 2005/0077* (2013.01); *G01J 2005/106* (2013.01)

(58) Field of Classification Search
  CPC .... G06V 30/416; G06V 20/95; G06V 30/127; G06V 10/143; G01J 5/0806; G01J 1/0411; G01J 2003/1213; G01J 2003/2806; G01J 2005/202; G01J 3/0208; G01J 3/0229; G01J 3/0256; G01J 3/0262
  USPC ........................................................ 348/165
  See application file for complete search history.

(56) References Cited

OTHER PUBLICATIONS

Rikke Gade et al., "Thermal Cameras and Applications: A Survey", Machine Vision and Applicants, Springer Verlag, DE, vol. 25, No. 1, Nov. 9, 2013 (Nov. 9, 2013).

\* cited by examiner

THERMAL IMAGING APPARATUS AND METHOD OF THERMAL IMAGING

FIELD

The present invention relates to a thermal imaging apparatus of the type that, for example, comprises an array of thermal sensing pixels that respectively receive and measure infra-red radiation. The present invention also relates to a method of thermal imaging, the method being of the type that, for example, uses an array of thermal sensing pixels to receive and measure infra-red radiation.

BACKGROUND

In the field of infra-red detection devices, it is known to provide detector devices comprising an array of thermal sensing pixels. When using such detector devices, it is known to determine a so-called digitisation image threshold value, which is an ideal value for distinguishing between a background and one or more thermal objects in a field of view being measured by a detector device. Owing to the nature of the array of thermal sensing elements, which can typically be an array of 24×32 pixels, insufficient measurement data points are available to determine the digitisation image threshold value.

A number of known techniques to determine the digitisation threshold value are based upon the calculation of histograms and analysis thereof. In this regard, binning of data is typically used, for example 8, 12 or 16 data bins. Highest and lowest measured temperatures are identified in order to determine a range of measured temperatures in a thermal image. Bin ranges are then determined based upon the range of measured temperatures and the number of data bins being employed. Once the bin ranges have been determined, a thermal image is typically scanned and for each pixel, the image is reproduced by replacing each measured temperature by an identifier of a bin in which the temperature of that pixel falls. Following such pre-processing, various techniques can be employed to determine the digitisation threshold value.

In one example, a histogram is generated based upon binned measurement data and a so-called balanced histogram technique is applied to the data. The balanced histogram technique finds a balancing point in the cumulative data of the histogram after excluding certain levels of measurements. Alternatively, a so-called maximum distance valley technique can be employed, whereby a highest or peak temperature bin is determined from the histogram in respect of the foreground and a highest or peak temperature is determined from the histogram in respect of the background. A line is then projected between the two peaks and a perpendicular line calculated that has a maximum distance to histogram bin values. The bin for the tally intersected by the perpendicular line is assumed to correspond to the digitisation threshold value. This technique works well for low bin content information in the foreground. A development of this technique, known as Otsu's method, comprises iterating through the possible threshold values and calculating a measure of spread for the pixel levels each side of the threshold, i.e. these are the pixels that are either foreground pixels or background pixels. The objective of this technique is to minimise the spread of the foreground and background pixel intensity values. When the minimum of the spread is found, the digitisation threshold value is deemed to have been found.

However, the above-described techniques do not produce consistently reliable results.

SUMMARY

According to a first aspect of the present invention, there is provided a thermal imaging apparatus comprising: a thermal detector device comprising an array of thermal sensing pixels; signal processing circuitry operably coupled to the thermal detector device and comprising a background identifier and a pixel classifier, the background identifier comprising a common intensity identifier and an expected background intensity calculator; the background identifier is configured to receive pixel measurement data of an image captured, when in use, by the thermal detector device in respect of pixels of the array of thermal sensing pixels and the common intensity identifier is configured to identify a largest number of substantially the same pixel intensity values from the pixel measurement data received; the expected background intensity calculator is configured to use the largest number of substantially the same pixel intensity values to generate a model of expected background intensity levels referable by pixel; and the pixel classifier is configured to use the model to determine whether an intensity measurement by a pixel of the array of thermal sensing pixels corresponds to a background of the image or an object in the image.

The background identifier may further comprise a pixel threshold calculator; the largest number of substantially the same pixel intensity values may have a range of measured pixel intensities associated therewith; the expected pixel intensity calculator may be configured to calculate a gradient across the range of measured pixel intensities, the model comprising the calculated gradient; the expected pixel intensity calculator may be configured to use the calculated gradient in order to generate a plurality of expected pixel background intensity values in respect of the array of thermal sensing pixels; the pixel threshold calculator may be configured to compare the plurality of expected pixel intensity values with the pixel measurement data in order to determine a temperature threshold value; and the pixel classifier may be configured to classify the intensity measurement by the pixel of the array of thermal sensing pixels as corresponding to the background or the object by comparing the intensity measurement with the temperature threshold value.

The common intensity identifier may be configured to sort the pixel measurement data received into an order to provide sorted pixel intensity measurement data.

The order may be ascending or descending.

The common intensity identifier may be configured to identify the largest number of substantially the same pixel intensity values from the sorted pixel intensity measurement data.

The common intensity identifier may be configured to calculate a plurality of intensity differential values by calculating differences between successive intensity measurements of the sorted pixel intensity measurement data.

The common intensity identifier may be configured to identify the largest number of substantially the same pixel intensity values by identifying ranges of substantially unchanged differential values in the plurality of intensity differential values and identifying a largest of the ranges of substantially unchanged differential values, thereby identifying the largest number of substantially the same pixel intensity values.

The gradient across the range of measured pixel intensities may be calculated with respect to a number of pixel intensity values of the measured sorted pixel intensity measurement data identified as the largest number of substantially the same pixel intensity values.

The background identifier may be configured to round the pixel measurement data received prior to the common intensity identifier identifying the largest number of substantially the same pixel intensity values from the pixel measurement data.

The common intensity identifier may be configured to analyse the plurality of intensity differential values and to identify occurrences of a lowest non-zero intensity differential value amongst the plurality of intensity differential values.

The pixel measurement data received may be stored as a first vector; the plurality of intensity differential values may be stored as a second vector; the plurality of expected pixel background intensity values may be stored as a third vector; and indexing of each of the first and third vectors may map to indexing of the array of thermal sensing pixels.

The pixel classifier may be configured to identify a first boundary pixel index in respect of the largest number of substantially the same pixel intensity values of the sorted pixel intensity measurement data and to select first expected pixel intensity values of the plurality of expected pixel intensity values and first pixel measurement data of the pixel measurement data having respective pixel indices incrementing in distance away from the first boundary pixel index; the array of thermal sensing pixels may generate a plurality of intensity measurements comprising the intensity measurement; and the pixel classifier may also be configured to compare each of the plurality of intensity measurements with the temperature threshold value.

The incremental increase of the indices of the first expected pixel intensity values of the plurality of expected pixel intensity values and first pixel measurement data of the pixel measurement data may be in a first direction away from the first boundary pixel index.

The pixel classifier may be configured to identify a second boundary pixel index in respect of the largest number of substantially the same pixel intensity values of the sorted pixel intensity measurement data and to select second expected pixel intensity values of the plurality of expected pixel intensity values and second pixel measurement data of the pixel measurement data having respective pixel indices incrementing in distance away from the second boundary pixel index so as to decrement in value; and the pixel classifier may also be configured to compare each of the plurality of intensity measurements with another temperature threshold value.

The incremental increase of the indices of the second expected pixel intensity values of the plurality of expected pixel intensity values and second pixel measurement data of the pixel measurement data may be in a second direction away from the second boundary pixel index.

The temperature threshold value may correspond to identification of pixels of the array of thermal sensing pixels measuring temperatures greater than a temperature of the background and the another temperature threshold value may correspond to identification of pixels of the array of thermal sensing pixels measuring temperatures less than the temperature of the background.

The temperature threshold value may comprise an adjustment by a noise margin.

The noise margin may be a number of standard deviations of a calculated noise level.

The signal processing circuitry may further comprise a filter configured to filter the sorted pixel intensity measurement data. The filter may be configured to perform sliding window averaging.

According to a second aspect of the present invention, there is provided a method of thermal imaging comprising: an array of thermal sensing pixels of a thermal detector device capturing an image from received infrared radiation and generating pixel measurement data therefrom; signal processing circuitry receiving the pixel measurement data and identifying a largest number of substantially the same pixel intensity values from the pixel measurement data received; the signal processing circuitry using the largest number of substantially the same pixel intensity values to generate a model of expected background intensity levels referable by pixel; and signal processing circuitry using the model to determine whether an intensity measurement by a pixel of the array of thermal sensing pixels corresponds to a background of the image or an object in the image.

According to a third aspect of the present invention, there is provided a method of thermal imaging comprising: capturing an image from received infrared radiation and generating pixel measurement data therefrom; receiving the pixel measurement data and identifying a largest number of substantially the same pixel intensity values from the pixel measurement data received; using the largest number of substantially the same pixel intensity values to generate a model of expected background intensity levels referable by pixel; and using the model to determine whether an intensity measurement by a pixel of the array of thermal sensing pixels corresponds to a background of the image or an object in the image.

It is thus possible to provide an apparatus and method that detects with improved accuracy pixels corresponding to a background of a scene in an image captured by a thermal detector device, for example a thermal imaging camera. The apparatus and method also improve consistency of accurate detection of background pixels. Furthermore, the apparatus and method provide such results even when a sensing array comprises a low number of pixels, for example a 24×32 pixel array.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Throughout the following description, identical reference numerals will be used to identify like parts.

Figure 1:
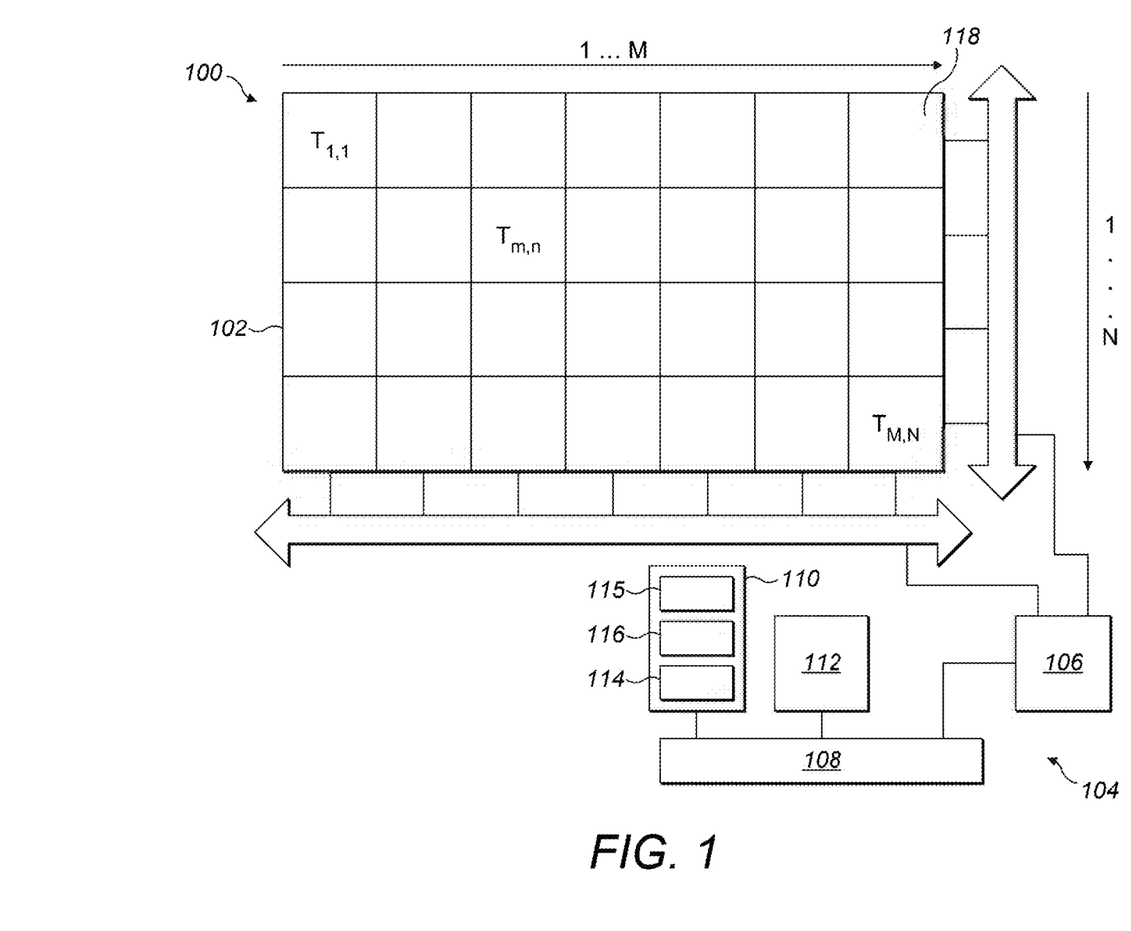
FIG. 1 is a schematic diagram of a thermal detector device constituting an embodiment of the invention.

Referring to FIG. 1, a thermal detector device 100 of a thermal imaging apparatus comprises an array of thermal sensing pixels 102 operably coupled to signal processing circuitry 104. In this example, the array of thermal sensing pixels 102 is arranged as a rectangular matrix of M columns of pixels and N rows of pixels. An example of a suitable array of thermal sensing pixels is the MLX90640 far infrared thermal sensor array available from Melexis, NV. The signal processing circuitry 104 comprises an image capture module 106 operably coupled to the array of thermal sensing pixels 102. As a description of the detail of the structure and/or operation of the image capture module 106 is not central to an understanding of this or other embodiments, for the same of conciseness and simplicity of description, the image capture module 106 will not be described in further detail herein.

In this example, the signal processing circuitry 104 also comprises a data store, for example a memory 108, such as a Random Access Memory (RAM), a background identifier unit 110 and a pixel classifier unit 112. The image capture module 106 is operably coupled to the memory 108. Likewise, the background identifier unit 110 and the pixel classifier unit 112 are operably coupled to the memory 108. The background identifier unit 110 supports and thus comprises a common intensity identifier unit 114, a pixel threshold calculator unit 115 and an expected background intensity calculator unit 116.

In operation (FIG. 2), the thermal detector device 100 is operated in an environment where thermal images need to be captured. The thermal detector device 100 is oriented towards a scene in the environment and a thermal image 300 (FIG. 3) is captured (Step 200). Infrared electromagnetic radiation emitted or reflected by objects in the scene are received by the array of thermal sensing pixels 102 within a field of view of the thermal detector device 100. In this example, the thermal image 300 captured contains a thermal representation of an object 302, for example a person, and a background 304.

The infrared electromagnetic radiation received by the array of thermal sensing pixels 102 is converted from the optical domain to the electrical domain. The image capture module 106 receives electrical signals from the array of thermal sensing pixels 102 representing raw intensity measurement data in respect of infrared electromagnetic radiation received by each pixel 118 of the array of thermal sensing pixels 102. Using the raw intensity data received, the image capture module 106 generates temperature measurement data in respect of each individual pixel 118 of the array of thermal sensing pixels 102. The temperature measurement data generated is stored in the memory 108. As mentioned above, the array of thermal sensing pixels 102 is arranged as an M×N matrix of pixels 118, and in this example the temperature measurement data is stored in the memory 108 in a manner that is indexed by row and column of the array of thermal sensing pixels 102, for example $T_{m,n}$, where T is the temperature of the pixel in the $m^{th}$ column and $n^{th}$ row.

Figure 4:
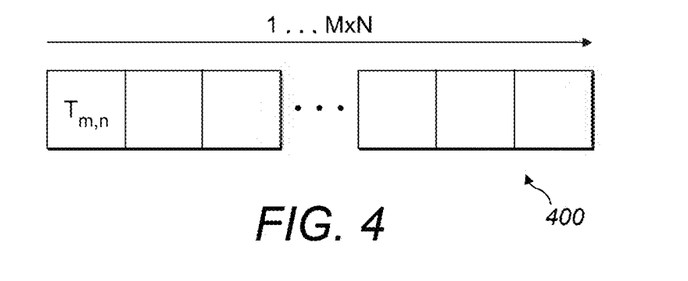
FIG. 4 is a schematic view of a first vector of sorted pixels intensity values.

The common intensity identifier unit 114 then accesses the temperature measurement data stored in the memory 108 and sorts (Step 202) the temperature measurement data in ascending order. Of course, in other examples, the temperature measurement data can be sorted in descending order. In any event, the sorted temperature measurement data is then stored, in this example, in a first vector 400.

In some embodiments, the temperature values stored in the first vector 400 can be rounded (Step 204) to a required accuracy or an accuracy within the capability of the signal processing circuitry 104, for example to the nearest 0.1 degrees Kelvin. In another optional stage, the rounded (or if no rounding is performed, the unrounded) sorted measured temperature values stored in the first vector 400 can be filtered (Step 206) by a filter (not shown) of the signal processing circuitry 104 using any suitable technique, for example a sliding window averaging technique or any other suitable low pass or averaging filter.

Figure 5:
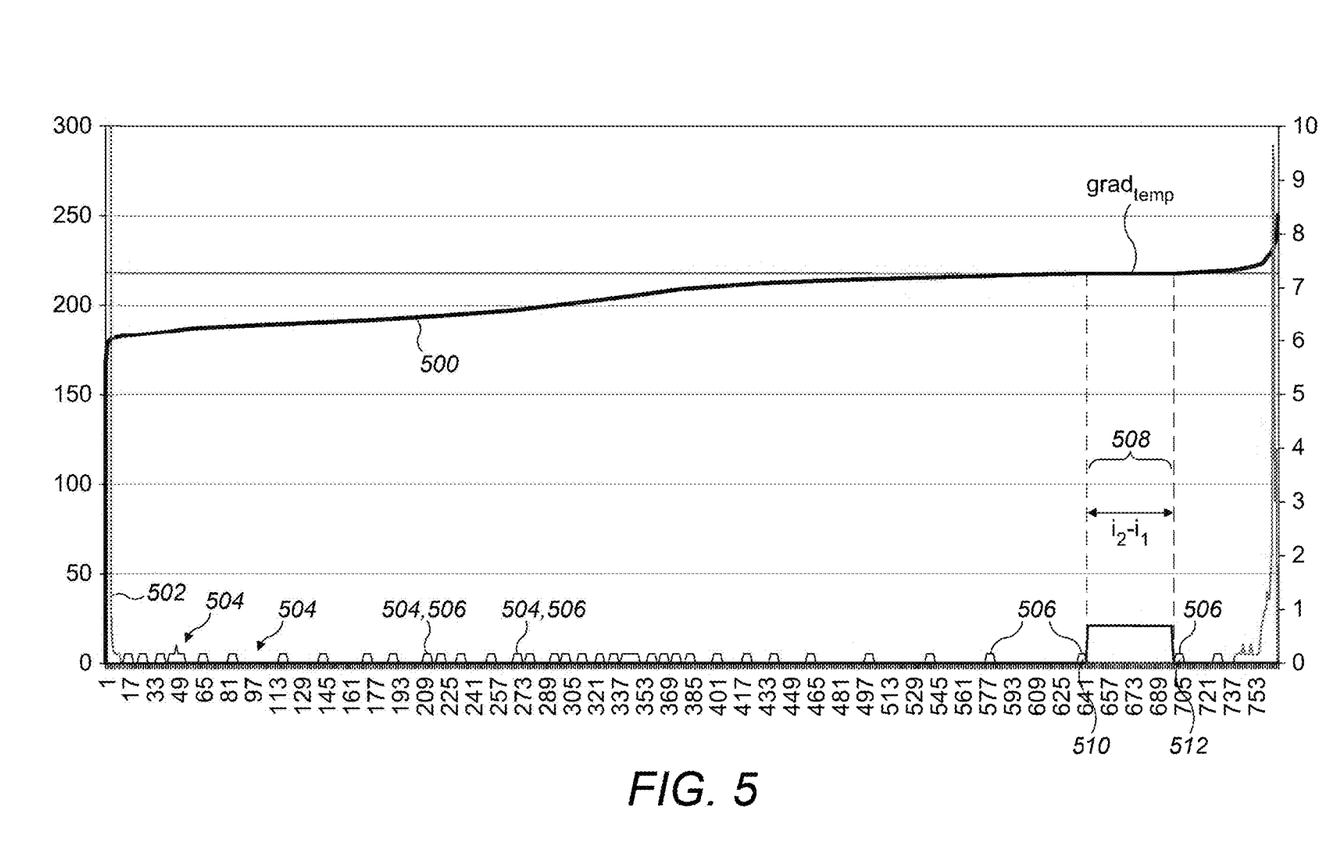
FIG. 5 is a graph of sorted measurement pixel intensity values and pixel differential values used by the method of FIG. 3.

Referring to FIG. 5, when plotted for improved visualisation to assist explanation of this example, the sorted temperature measurement data stored by the first vector 400 results in a measured temperature first plot 500 of incrementing temperature.

Using the sorted measured temperature data stored by the first vector 400 in the memory 108, the common intensity identifier unit 114 then calculates (Step 208) temperature differentials between temperature values stored between successive neighbouring indices of the first vector 400, i.e. $T_{n+1}-T_n$, where T is the temperature value stored and n is the index of the first vector 400. The result of the calculations of temperature differential values in respect of successive neighbouring indices of the first vector 400 are stored (Step 210) as a second vector (not shown). When plotted to assist visualisation, a temperature differential second plot 502 comprises measures of increments in temperature 504 between neighbouring indices of the first vector 400. In this regard, since the intensity values of the background 304 of the captured image 300 are generally quite even in terms of temperature variations, especially after filtering, the temperature differential second plot 502 comprises several temperature differential values that are substantially the same. The purpose of the common intensity identifier is therefore to identify the largest number of substantially the same pixel intensity values from the temperature measurement data stored by the memory 108. In one example, this is achieved by the common intensity identifier unit 114 identifying (Step 212) the smallest non-zero temperature differential values 506 stored in the second vector. Typically, the second vector will comprise more than one occurrence of the smallest non-zero temperature differential values 506 and therefore more than one range of pixels having intensity values that are substantially the same. Once all the smallest non-zero temperature differential values 506 have been identified, the expected background intensity calculator unit 116 calculates (Step 214) index distances in respect of the first vector 400 between each consecutive neighbouring pair of smallest non-zero temperature differential values 506. Once the index distances have been calculated the longest distance 508 between smallest non-zero temperature differential values 506 is selected (Step 216), thereby identifying the largest of the above-mentioned ranges of pixels having substantially the same (unchanged) intensity values associated therewith.

The longest distance 508 is bounded by two occurrences of the smallest non-zero temperature differential values 506 at: a lower index value, $i_1$, 510 and a higher index value, $i_2$, 512. The lower index value, $i_1$, 510 has a corresponding first measured temperature value, $t_1$, that can be referenced and obtained from the sorted temperature measurement data stored by the first vector 400. Likewise, the second index value, $i_2$, 512 has a corresponding second measured temperature value, $t_2$, that can be referenced and obtained from the sorted temperature measurement data stored by the first vector 400. Although substantially the same, the largest number of substantially the same pixel intensity values nevertheless comprise a range of measured pixel intensities associated therewith. The expected background intensity calculator unit 116 then uses the lower and upper index values, $i_1$, $i_2$, and their corresponding measured temperature values, $t_1$, $t_2$, in order to calculate (Step 218) a gradient across the range of measured pixel intensities:

$$\text{grad}_{temp} = \frac{t_2 - t_1}{i_2 - i_1} \quad (1)$$

The expected background intensity calculator unit 116 then uses the gradient calculated, $\text{grad}_{temp}$, to calculate expected background pixel temperatures in respect of the range of indices corresponding to all the pixel coordinates:

$$T_{Ei} = (i - i_1)\text{grad}_{temp} + t_1 \quad (2)$$

where i is the current index for which the estimated background temperature, $T_{Ei}$, is being calculated, i corresponding to the index of the first vector 400, $i_1$ is the lower indexed smallest value mentioned above and $t_1$ is the first measured temperature value at the lower index value, $i_1$, mentioned above. The calculation of the gradient, $\text{grad}_{temp}$, and the application of equation (2) above constitutes modelling of expected background intensity levels referable by pixel.

In this example, equation (2) above is employed by iterating through the index value i in order to calculate (Step 220) the expected background pixel temperature values, $T_{Ei}$, for each index value, i, corresponding to each index value of the first vector 400. The expected background pixel temperature values calculated are stored (Step 220) in the memory 108 as a third vector. In this example, it should therefore be appreciated that indexing of one or more of the first, second and third vectors corresponds or maps to the pixel indices of the array of thermal sensing pixels 102.

Figure 2:
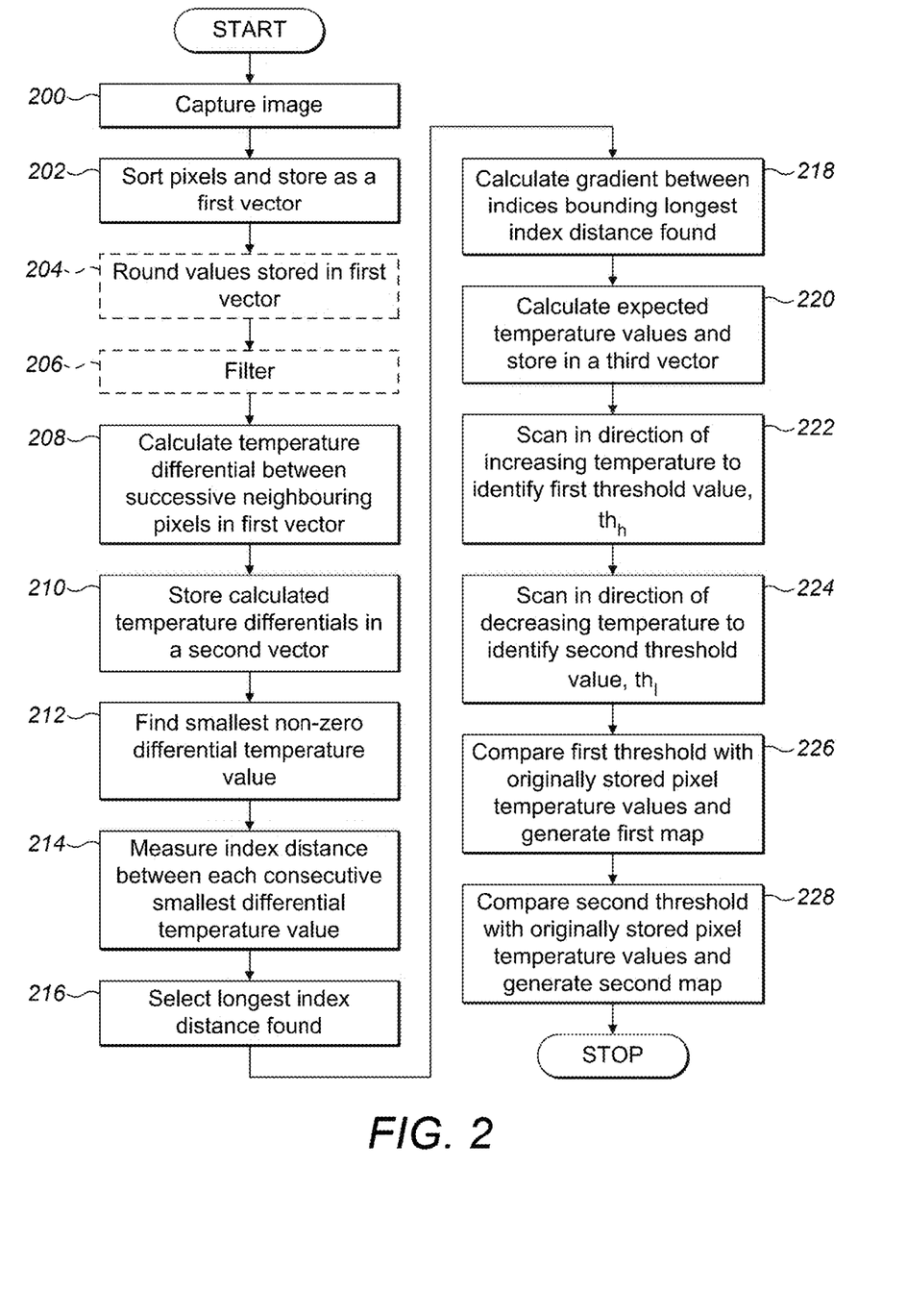
FIG. 2 is a screen shot of an image captured by the thermal detector device of FIG. 1.

Once the expected background pixel temperature values, $T_{Ei}$, have been calculated (Step 220), the pixel threshold calculator unit 115 then steps through the indices of the first vector and the third vector in the following manner in order to determine a first threshold value, $th_h$, relating to temperatures greater than a temperature of the background 304 and a second threshold value, $th_l$, relating to temperatures less than the temperature of the background 304. In order to determine the first threshold value, $th_h$, the threshold calculator 115 selects the upper index value, $i_2$, and incrementally compares (Step 222) on an index-wise basis the measured temperature value, $T_i$, stored by the first vector with the expected background pixel temperature values, $T_{Ei}$, of the corresponding index of the third vector. This process of comparing stored values of corresponding indices of the first and third vectors continues until an index value, h, is identified where the measured temperature, $T_h$, exceeds a corresponding expected background pixel temperature values, $T_{Eh}$, by a precalculated noise margin details of which are described later herein. The temperature with the noise margin taken into account is then recorded as the first threshold value, $th_h$. Similarly, in order to determine the second threshold value, $th_l$, the threshold calculator 115 selects the lower index value, $i_1$, and decrementally compares (Step 224) on an index-wise basis the measured temperature value, $T_i$, stored by the first vector with the expected background pixel temperature values, $T_{Ei}$, of the corresponding index of the third vector. This process of comparing stored values of corresponding indices of the first and third vectors continues until another index value, I, is identified where the measured temperature, $T_l$, falls below a corresponding expected background pixel temperature values, $T_{El}$, by the precalculated noise margin. The temperature with the noise margin taken into account is then recorded as the second threshold value, $th_l$.

Although, in the above example, the search for the first and second threshold values, $th_h$, $th_l$, commences at the upper index value, $i_2$, and the lower index value, $i_1$, respectively, it should be appreciated that in other examples the pixel threshold calculator 115 can select an index, $i_m$, corresponding to a mid-point of the longest distance 508 bounded by the lower index value, $i_1$, 510 and the upper index value, $i_2$, 512, and then search in the decremental and/or incremental directions from the mid-point index, $i_m$.

Thereafter, in this example, the pixel classifier unit 112 accesses the temperature measurement data initially generated by the image capture module 106 and stored in the memory 108 and analyses the data in respect of each pixel of the array of thermal sensing pixels 102 by comparison (Step 226) of the temperature measurement data stored in the memory 108 in respect of each pixel with the first calculated threshold value, $th_h$. In this regard, the pixel classifier unit 112 builds a first map corresponding, in this example, to the measurement temperature data stored in the memory 108 for the array of thermal sensing pixels 102. The first map is generated by determining when a measurement temperature exceeds the first calculated threshold value, $th_h$, and storing in the first map of the array of thermal sensing pixels 102 an indication that the corresponding pixel of the array of thermal sensing pixels 102 is a so-called "hot" pixel. Once testing in relation to the first calculated threshold value, $th_h$, has been completed, map generation is performed in a like manner in relation to the second calculated threshold value, $th_l$. In this regard, the pixel classifier unit 112 again accesses the temperature measurement data initially generated by the image capture module 106 and stored in the memory 108 and analyses the data in respect of each pixel of the array of thermal sensing pixels 102 by comparison (Step 228) of the temperature measurement data stored in the memory 108 in respect of each pixel with the second calculated threshold value, $th_l$. This comparison process is again used by the pixel classifier unit 112 to build a second map corresponding, in this example, directly to the measurement temperature data stored in the memory 108 for the array of thermal sensing pixels 102. The second map is generated by determining when a measurement temperature is less than the second calculated threshold value, $th_l$, and storing an indication in the second map of the array of thermal sensing pixels 102 that the corresponding pixel of the array of thermal sensing pixels 102 is a so-called "cold" pixel.

In the above example, two maps have been generated respectively for the first and second threshold values, $th_h$, $th_l$. However, depending upon a desired application of the apparatus only one or the other of the first and second maps can be required. As such, it should be appreciated that although calculation of both of the first and second threshold values and subsequent generation of maps is described above, only one of the two threshold values can be calculated for some applications and a hence only a corresponding one of the maps generated.

In this example, the first and second predetermined thresholds, $th_l$, $th_h$, are used in conjunction with an estimation of noise margin, for example an average noise margin. The average noise margin can be adjusted by a predetermined amount. In this regard, the margin may be based upon a number of standard deviations from the mean noise margin, for example 6-sigma. The mean noise margin can be based upon a calculation of the overall noise of the apparatus. The threshold values, $th_l$, $th_h$, can also or alternatively be increased or decreased arbitrarily for optimisation purposes depending upon the results obtained.

Figure 3:
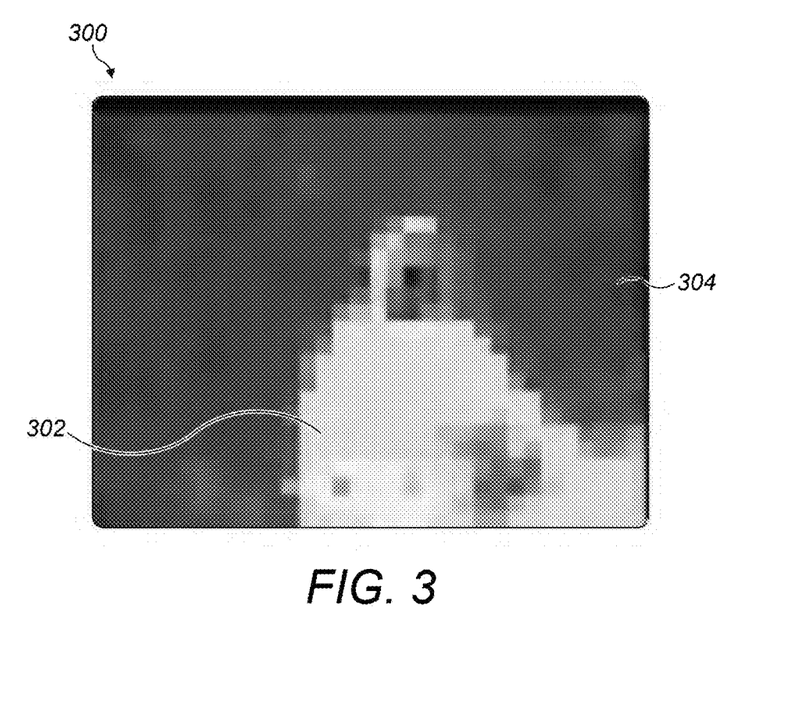
FIG. 3 is a flow diagram of a method of thermal imaging constituting another embodiment of the invention.
Figure 6:
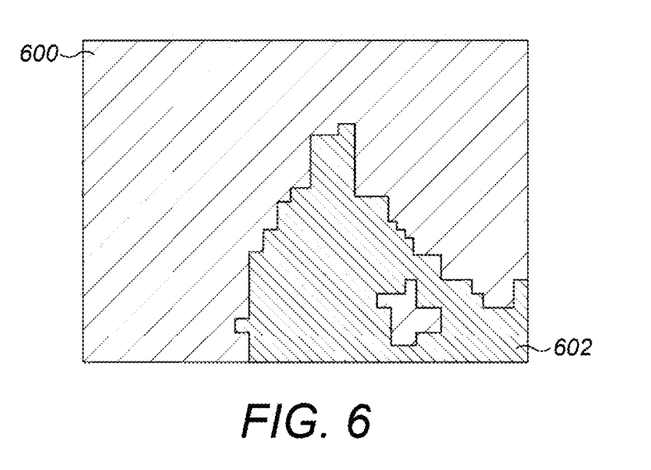
FIG. 6 is screen shot of pixels values following processing by the method of FIG. 3 and identifying background and object pixels.

Once the pixels of the captured image 300 have been classified, it is possible for further processing of the captured image 300 taking into account the pixels classified as the background 600 and the pixels classified as the object 602. The nature of the further processing is not central to an understanding of the examples set forth herein and so will not be described in further detail for the sake of clarity and conciseness of description.

In the above examples, the skilled person will appreciate that any suitable memory management technique can be employed in order to be able to reference classified pixel data back to the temperature measurement data generated by the image capture module 106 and stored in the memory 108 in respect of each pixel 118 of the array of thermal sensing pixels 102. By employing such a technique, it is possible to relate the result of a pixel classification in respect of a vector index to a pixel 118 of the array of thermal sensing pixels 102.

The skilled person should appreciate that the above-described implementations are merely examples of the various implementations that are conceivable within the scope of the appended claims. Indeed, it should be appreciated that in the above example, the first and second predetermined thresholds, $th_l$, $th_h$, are different, but in other examples the first and second predetermined thresholds, $th_l$, $th_h$, can be the same, i.e. a single threshold value can be employed. It should also be appreciated that although the examples set forth herein describe the use of thermopile sensors, any suitable type of temperature sensor can be employed, for example Bolometer devices.

References herein to terms such as "exceeding"/"greater than" and "less than" should be understood also to contemplate alternatives such as "greater than or equal to" and/or "less than or equal to".

It should be appreciated that references herein to "infrared", other than where expressly stated otherwise, are intended as references to electromagnetic energy having wavelengths in the range of 700 nm to 1 mm, such as 760 nm to 1 mm or 700 nm to 1500 nm, which includes electromagnetic radiation in the near infrared region, the middle infrared region and the far infrared region.

What is claimed is:

1. A thermal imaging apparatus comprising:
   a thermal detector device comprising an array of thermal sensing pixels;
   signal processing circuitry operably coupled to the thermal detector device and comprising a background identifier and a pixel classifier, the background identifier comprising a common intensity identifier and an expected background intensity calculator;
   the background identifier is configured to receive pixel measurement data of an image captured, when in use, by the thermal detector device in respect of pixels of the array of thermal sensing pixels and the common intensity identifier is configured to identify a largest number of substantially the same pixel intensity values from the pixel measurement data received;
   the expected background intensity calculator is configured to use the largest number of substantially the same pixel intensity values to generate a model of expected background intensity levels referable by pixel; and
   the pixel classifier is configured to use the model to determine whether an intensity measurement by a pixel of the array of thermal sensing pixels corresponds to a background of the image or an object in the image.

2. The apparatus according to claim 1, wherein
   the background identifier further comprises a pixel threshold calculator;
   the largest number of substantially the same pixel intensity values has a range of measured pixel intensities associated therewith;
   the expected background intensity calculator is configured to calculate a gradient across the range of measured pixel intensities, the model comprising the calculated gradient;
   the expected background intensity calculator is configured to use the calculated gradient in order to generate a plurality of expected pixel background intensity values in respect of the array of thermal sensing pixels;
   the pixel threshold calculator is configured to compare the plurality of expected pixel intensity values with the pixel measurement data in order to determine a temperature threshold value; and
   the pixel classifier is configured to classify the intensity measurement by the pixel of the array of thermal sensing pixels as corresponding to the background or the object by comparing the intensity measurement with the temperature threshold value.

3. The apparatus according to claim 2, wherein the common intensity identifier is configured to sort the pixel measurement data received into an order to provide sorted pixel intensity measurement data.

4. The apparatus according to claim 3, wherein the common intensity identifier is configured to identify the largest number of substantially the same pixel intensity values from the sorted pixel intensity measurement data.

5. The apparatus according to claim 3, wherein the common intensity identifier is configured to calculate a plurality of intensity differential values by calculating differences between successive intensity measurements of the sorted pixel intensity measurement data.

6. The apparatus according to claim 5, wherein the common intensity identifier is configured to identify the largest number of substantially the same pixel intensity values by identifying ranges of substantially unchanged differential values in the plurality of intensity differential values and identifying a largest of the ranges of substantially unchanged differential values, thereby identifying the largest number of substantially the same pixel intensity values.

7. The apparatus according to claim 6, wherein the common intensity identifier is configured to analyze the plurality of intensity differential values and to identify occurrences of a lowest non-zero intensity differential value amongst the plurality of intensity differential values.

8. The apparatus according to claim 5, wherein
   the pixel measurement data received is stored as a first vector;
   the plurality of intensity differential values is stored as a second vector;
   the plurality of expected pixel background intensity values is stored as a third vector; and
   indexing of each of the first and third vectors maps to indexing of the array of thermal sensing pixels.

9. The apparatus according to claim 4, wherein
   the pixel classifier is configured to identify a first boundary pixel index in respect of the largest number of substantially the same pixel intensity values of the sorted pixel intensity measurement data and to select first expected pixel intensity values of the plurality of expected pixel intensity values and first pixel measurement data of the pixel measurement data having respective pixel indices incrementing in distance away from the first boundary pixel index;

the array of thermal sensing pixels generates a plurality of intensity measurements comprising the intensity measurement; and the pixel classifier is also configured to compare each of the plurality of intensity measurements with the temperature threshold value.

10. The apparatus according to claim 9, wherein the pixel classifier is configured to identify a second boundary pixel index in respect of the largest number of substantially the same pixel intensity values of the sorted pixel intensity measurement data and to select second expected pixel intensity values of the plurality of expected pixel intensity values and second pixel measurement data of the pixel measurement data having respective pixel indices incrementing in distance away from the second boundary pixel index so as to decrement in value; and the pixel classifier is also configured to compare each of the plurality of intensity measurements with another temperature threshold value.

11. The apparatus according to claim 2, wherein the temperature threshold value comprises an adjustment by a noise margin.

12. The apparatus according to claim 11, wherein the noise margin is a number of standard deviations of a calculated noise level.

13. The apparatus according to claim 3, wherein the signal processing circuitry further comprises a filter configured to filter the sorted pixel intensity measurement data.

14. The apparatus according to claim 3, wherein a filter is configured to perform sliding window averaging.

15. The apparatus according to claim 1, wherein the common intensity identifier is configured to sort the pixel measurement data received into an order to provide sorted pixel intensity measurement data.

16. The apparatus according to claim 15, wherein the common intensity identifier is configured to identify the largest number of substantially the same pixel intensity values from the sorted pixel intensity measurement data.

17. The apparatus according to claim 15, wherein the common intensity identifier is configured to calculate a plurality of intensity differential values by calculating differences between successive intensity measurements of the sorted pixel intensity measurement data.

18. The apparatus according to claim 17, wherein the common intensity identifier is configured to identify the largest number of substantially the same pixel intensity values by identifying ranges of substantially unchanged differential values in the plurality of intensity differential values and identifying a largest of the ranges of substantially unchanged differential values, thereby identifying the largest number of substantially the same pixel intensity values.

19. The apparatus according to claim 15, wherein the signal processing circuitry further comprises a filter configured to filter the sorted pixel intensity measurement data.

20. The apparatus according to claim 15, wherein a filter is configured to perform sliding window averaging.

21. A method of thermal imaging comprising:

an array of thermal sensing pixels of a thermal detector device capturing an image from received infrared radiation and generating pixel measurement data therefrom;

signal processing circuitry receiving the pixel measurement data and identifying a largest number of substantially the same pixel intensity values from the pixel measurement data received;

the signal processing circuitry using the largest number of substantially the same pixel intensity values to generate a model of expected background intensity levels referable by pixel; and signal processing circuitry using the model to determine whether an intensity measurement by a pixel of the array of thermal sensing pixels corresponds to a background of the image or an object in the image.

* * * * *